US012046162B2

(12) United States Patent
Ambartsoumian

(10) Patent No.: US 12,046,162 B2
(45) Date of Patent: Jul. 23, 2024

(54) SHIELDED DIRECT THERMAL LABEL AND METHODS

(71) Applicant: Gourgen Ambartsoumian, Laval (CA)

(72) Inventor: Gourgen Ambartsoumian, Laval (CA)

(*) Notice: Subject to any disclaimer, the term of this patent is extended or adjusted under 35 U.S.C. 154(b) by 49 days.

(21) Appl. No.: 17/949,615

(22) Filed: Sep. 21, 2022

(65) Prior Publication Data

US 2023/0019981 A1 Jan. 19, 2023

Related U.S. Application Data

(63) Continuation-in-part of application No. 16/217,885, filed on Dec. 12, 2018, now Pat. No. 11,472,214.

(60) Provisional application No. 62/597,665, filed on Dec. 12, 2017.

(51) Int. Cl.

| | |
|---|---|
| ***G09F 3/02*** | (2006.01) |
| ***B41M 5/323*** | (2006.01) |
| ***B41M 5/40*** | (2006.01) |
| ***B41M 5/41*** | (2006.01) |

(52) U.S. Cl.

CPC ............... *G09F 3/02* (2013.01); *B41M 5/323* (2013.01); *B41M 5/405* (2013.01); *B41M 5/41* (2013.01); *B41M 2205/36* (2013.01); *B41M 2205/40* (2013.01); *G09F 2003/0201* (2013.01); *G09F 2003/0202* (2013.01); *G09F 2003/0229* (2013.01); *G09F 2003/023* (2013.01); *G09F 2003/0257* (2013.01)

(58) Field of Classification Search

None

See application file for complete search history.

(56) References Cited

U.S. PATENT DOCUMENTS

| | | | | |
|---|---|---|---|---|
| 4,886,774 A | | 12/1989 | Doi | |
| 5,234,798 A | * | 8/1993 | Heninger ............... | G03C 5/164 503/200 |
| 5,424,182 A | | 6/1995 | Marginean, Sr. et al. | |
| 5,753,587 A | | 5/1998 | Podszun et al. | |

(Continued)

FOREIGN PATENT DOCUMENTS

WO 2016152088 A1 9/2016

OTHER PUBLICATIONS

High Purity 1-Hydroxycyclohexyl Phenyl Ketone via http://www.sellchems.com/products/uv-photoinitiators/cas-947-19-3/.

(Continued)

*Primary Examiner* — Laura C Powers

(74) *Attorney, Agent, or Firm* — NORTON ROSE FULBRIGHT CANADA LLP

(57) ABSTRACT

A roll of direct-thermal material may have a length of direct-thermal material including a facestock. An adhesive layer is on a first side of the facestock. A direct thermal coating is on a second side of the facestock, the direct thermal coating configured to selectively darken by heat activation when direct thermal printed. a cured ultraviolet LED coating is on the direct thermal coating, the cured ultraviolet LED coating having photoinitiators with substantial activation at an exposure limited to LED radiation at a 365 nm-450 nm wavelength range, and configured to allow direct thermal printing of the direct thermal coating therethrough, the cured ultraviolet LED coating curable without heat activating the direct thermal coating. The length of direct-thermal material being rolled on itself.

24 Claims, 8 Drawing Sheets

(56) References Cited

U.S. PATENT DOCUMENTS

| | | | |
|---|---|---|---|
| 2004/0171485 | A1 | 9/2004 | Nagaie et al. |
| 2009/0249670 | A1 | 10/2009 | Henkel et al. |
| 2009/0286032 | A1 | 11/2009 | Franklin |
| 2015/0161915 | A1* | 6/2015 | Wild .......................... C09J 7/22 428/352 |
| 2016/0244250 | A1 | 8/2016 | Dolan, Jr. |

OTHER PUBLICATIONS

1-Hydroxycyclohexyl Phenyl Ketone—BoldChem Tech.
Ingracure 184 CAS 947-19-3—BoldChem Tech.

* cited by examiner

SHIELDED DIRECT THERMAL LABEL AND METHODS

CROSS-REFERENCE TO RELATED APPLICATION

The present application is a continuation-in-part of U.S. patent application Ser. No. 16/217,885, filed on Dec. 12, 2018, incorporated herein by reference and which claims the priority of U.S. Provisional Patent Application No. 62/597,665, filed on Dec. 12, 2017, the contents of which are incorporated herein by reference.

TECHNICAL FIELD

The present application relates to direct thermal printing and labels.

BACKGROUND OF THE ART

Direct thermal printing involves the heating of selected areas or zones of a coating on a substrate in order to heat activate a dye by reaction with a matrix. According to FIGS. 1A-1B of the prior art, a typical direct thermal label 10 is shown as having a facestock 11, an adhesive 12 covering an undersurface of the facestock 11, an adhesive release layer 13, and a support liner 14, in one possible embodiment. The facestock 11 and adhesive 12 are united together and upon removal of the facestock 11 from the support liner 14, the adhesive 12 remains bonded to it. The removal of the facestock 11 from the support liner 14 may be facilitated by the adhesive release layer 13. The label 10 has a direct thermal coating 15, with dye and matrix. The print head A is controlled to heat the desired areas of the direct thermal and cause the reaction between dye and matrix, to blacken the areas. The blackened areas define the printing on the label 10.

Direct thermal printing is known to be cost effective, notably by not requiring a toner, a printer-applied ink or an inked ribbon in a printer, and thus printed by the relatively inexpensive printers used in direct thermal printing. However, areas printed with direct thermal may tend to fade over time, and may lack the capacity of resisting to liquids such as solvents and chemicals. It is known to apply an ultraviolet (UV) varnish over labels, but conventional wide-spectrum UV curing will heat the direct-thermal material and cause blackening and renders the use of the UV varnish impractical in some instances.

SUMMARY

It is an aim of the present disclosure to provide a label with UV coating that addresses issues related to the prior art.

It is a further aim of the present disclosure to provide a method for printing and protecting a direct thermal label with a LED UV coating.

Therefore, in accordance with the present disclosure, there is provided a roll of direct-thermal material comprising: a length of direct-thermal material, the direct-thermal material including a facestock, an adhesive layer on a first side of the facestock, a direct thermal coating on a second side of the facestock, the direct thermal coating configured to selectively darken by heat activation when direct thermal printed, and a cured ultraviolet LED coating on the direct thermal coating, the cured ultraviolet LED coating having photoinitiators with substantial activation at an exposure limited to LED radiation at a 365 nm-450 nm wavelength range, and configured to allow direct thermal printing of the direct thermal coating therethrough, the cured ultraviolet LED coating curable without heat activating the direct thermal coating; wherein the length of direct-thermal material being rolled on itself.

DETAILED DESCRIPTION

Figures 1A, 1B:
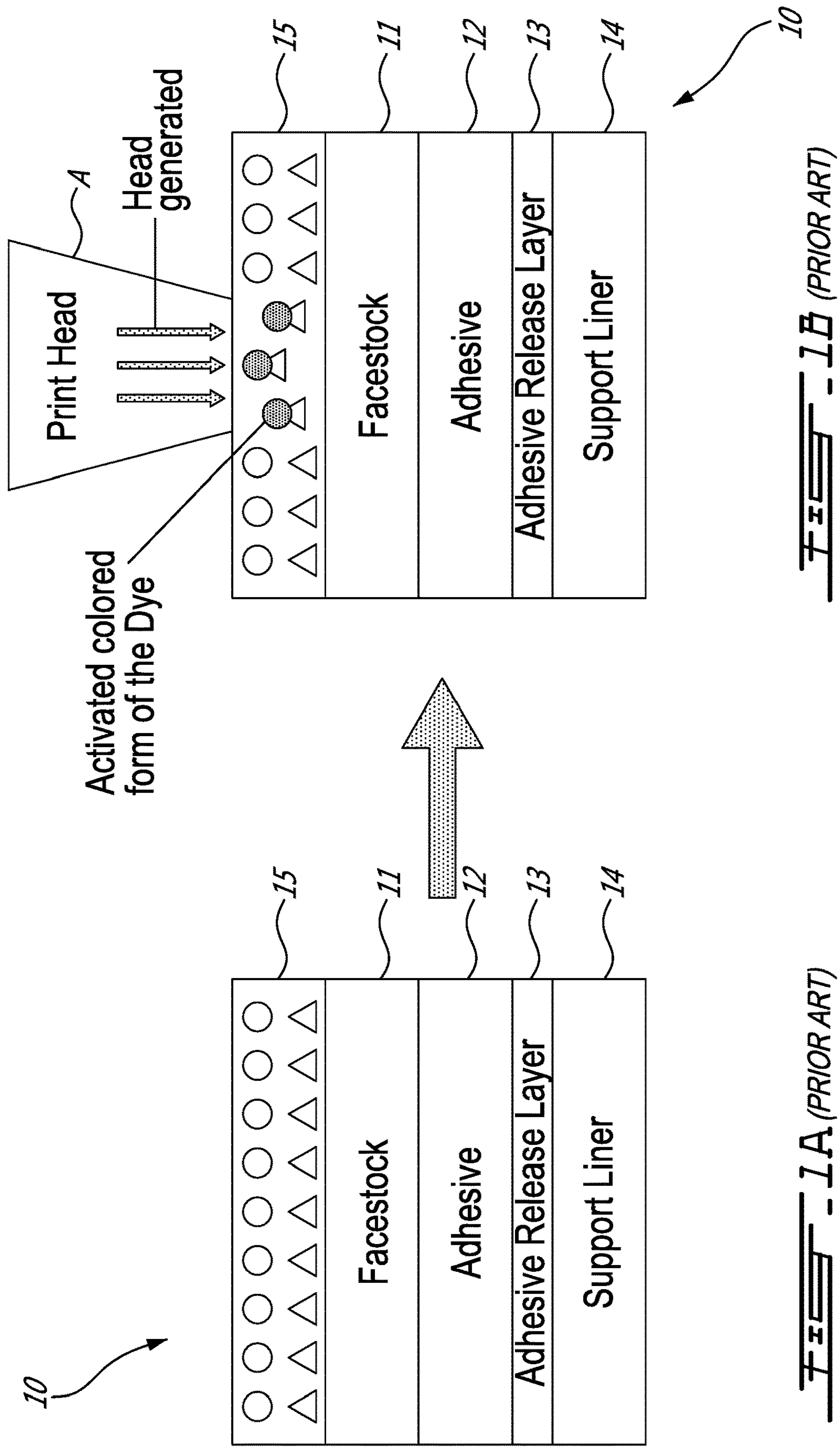
FIG. 1B (PRIOR ART)
FIG. 1A (PRIOR ART)
FIGS. 1A and 1B are schematic views of a sequence of a direct thermal label prior to printing and followed by a printing thereof in accordance with the prior art.
Figures 2A, 2B, 2C:
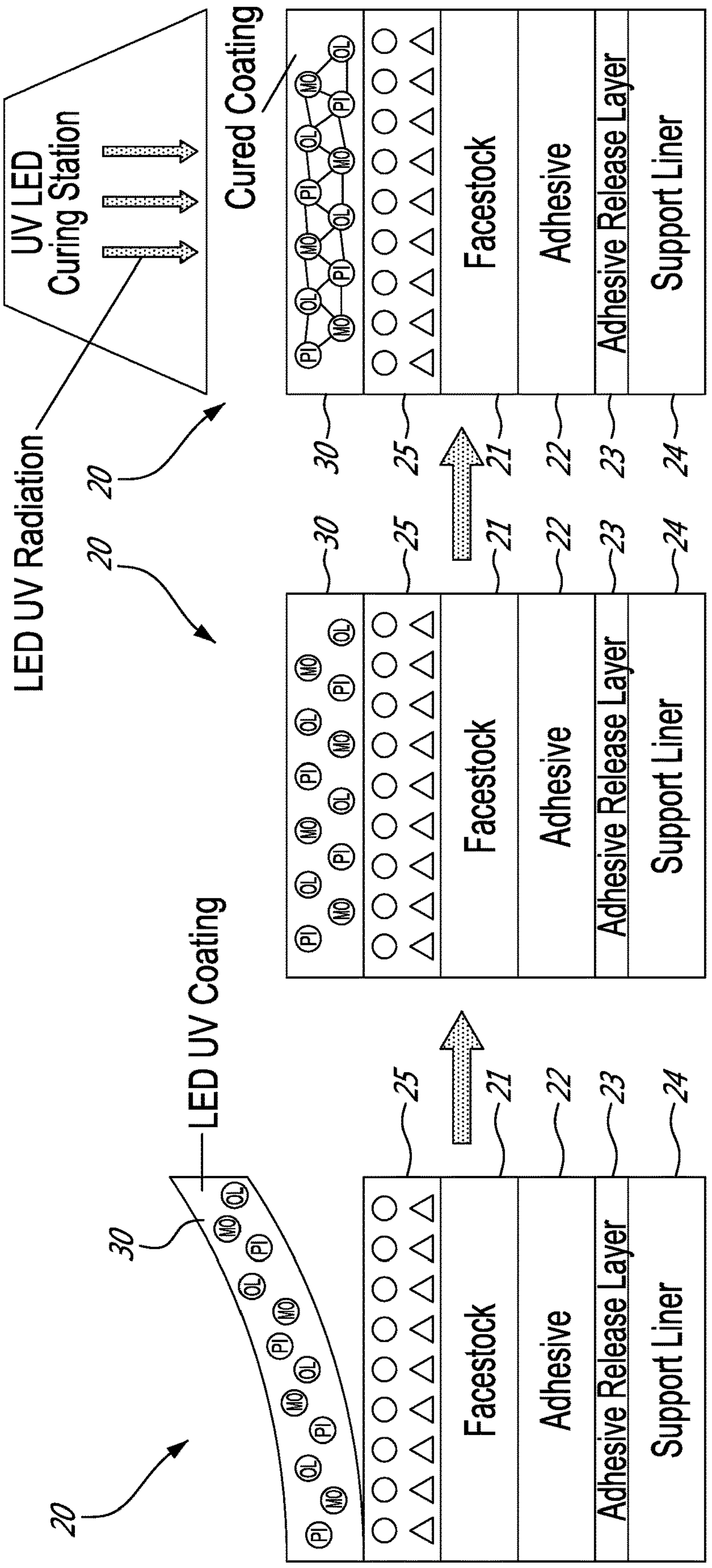
FIGS. 2A-2C are schematic views of sequence of a method of fabricating of a direct thermal label with LED UV coating in accordance with the present disclosure.

Referring to the drawings and more particularly to FIGS. 2A-2C, a direct thermal label with LED UV coating in accordance with the present disclosure is generally shown at 20. The label 20 may have a facestock 21, an adhesive 22 covering an undersurface of the facestock 21, an adhesive release layer 23, and/or a support liner 24, in one possible embodiment. For example, the label 20 may be without the adhesive release layer 23, and/or with the support liner 24 having a low adherence surface in contact with the adhesive 22. The facestock 21 and adhesive 22 may be pulled out of engagement with the support liner 24, for instance as assisted by the adhesive release layer 23 if present. The facestock 21 may then be adhered to an object by way of the adhesive 22. The facestock 21 may be made of any appropriate materials, such as paper or fiber-based materials, polymers, synthetic films, thermoplastic films such as polyolefins, polypropylenes, biaxially oriented polypropylene (BOPP), polyesters (polyethylene terephthalate), polyvinyl, polyethylene of any density, synthetic paper, polyimide, polyamide (nylon), acrylate, polystyrene and similar polymer based materials, Tyvek® and similar materials, Teslin® and similar materials, cloth, fabric, metallic foil, metallized films, paper, impregnated paper, latex impregnated paper, silicone rubber, composite materials comprising any combination of fiber, polymer, filament, thermoplastic, polyvinyl alcohol (PVA), foil, cloth or fabric, etc. According to an embodiment, the facestock 21 has a thickness between 0.5 mil-10 mil, although it may also be thinner or thicker. For example, the range of thickness of the facestock may be between 0.2 mil-20.0 mil, inclusively, depending on the contemplated application. The label material may include an ink layer over the facestock 21, within the facestock 21 and/or within or over direct thermal coating 25. In another embodiment applicable to all figures herein, but only shown in FIG. 3A, a layer of an ink 26 is optionally applied over the direct thermal coating 25 underneath the LED-UV coating 30 (i.e. between them) in order to color code the label 20 which will allow the direct-thermal print to be fully visible, readable and barcode scannable after printing through the ink layer. In another embodiment applicable to all figures herein, but only shown in FIG. 3B, a layer of an ink 27 is optionally applied over the facestock 21 and underneath the direct thermal coating 25 (i.e., between them). In another embodiment, the facestock 21 and/or direct thermal coating 25 may comprise an additional layer of a topcoat. The facestock 21 of the material might be opaque or transparent, or have different degrees of opacity and transparency. Yet in another embodiment, the facestock 21 may be devoid of adhesive 22, support liner 24 and adhesive release layer 23 if present, for the facestock 21 to be used as a non-adhesive material in a roll, sheet, tag or a fanfold format. The facestock 21 may be a static cling film on a support liner without an adhesive. The label 20 with such a facestock 21 may be attached to surfaces through static. Yet in another embodiment the facestock 21 may be unsupported tag material without adhesive or support liner which can be used as a non-adhesive tag without adhesive. It can be used as a hanging tag or an insertion tag as a non-limitative example.

Figures 3A, 3B:
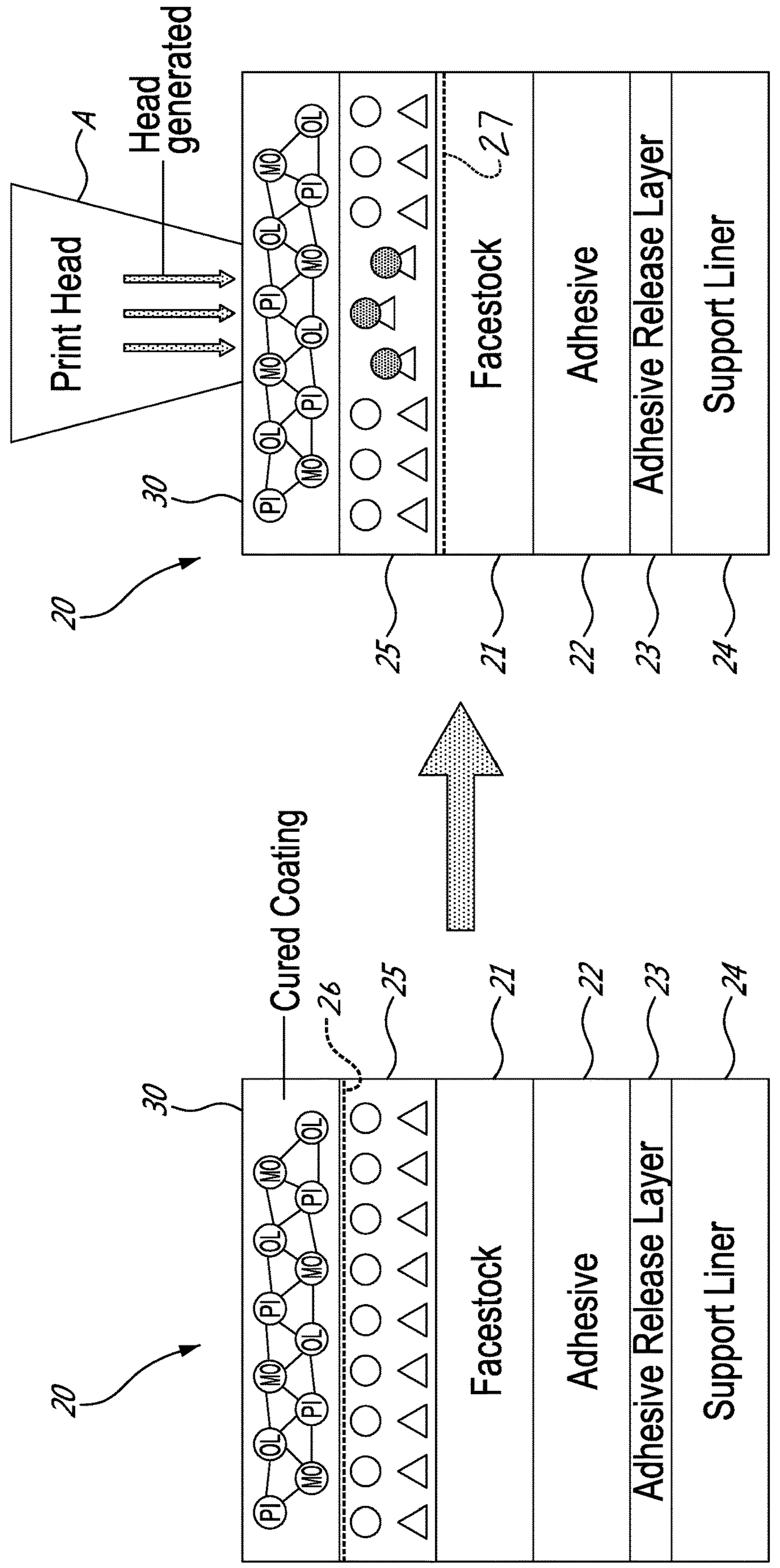
FIGS. 3A and 3B are schematic views of a method for printing the direct thermal label with UV coating of the present disclosure.
Figure 4A:
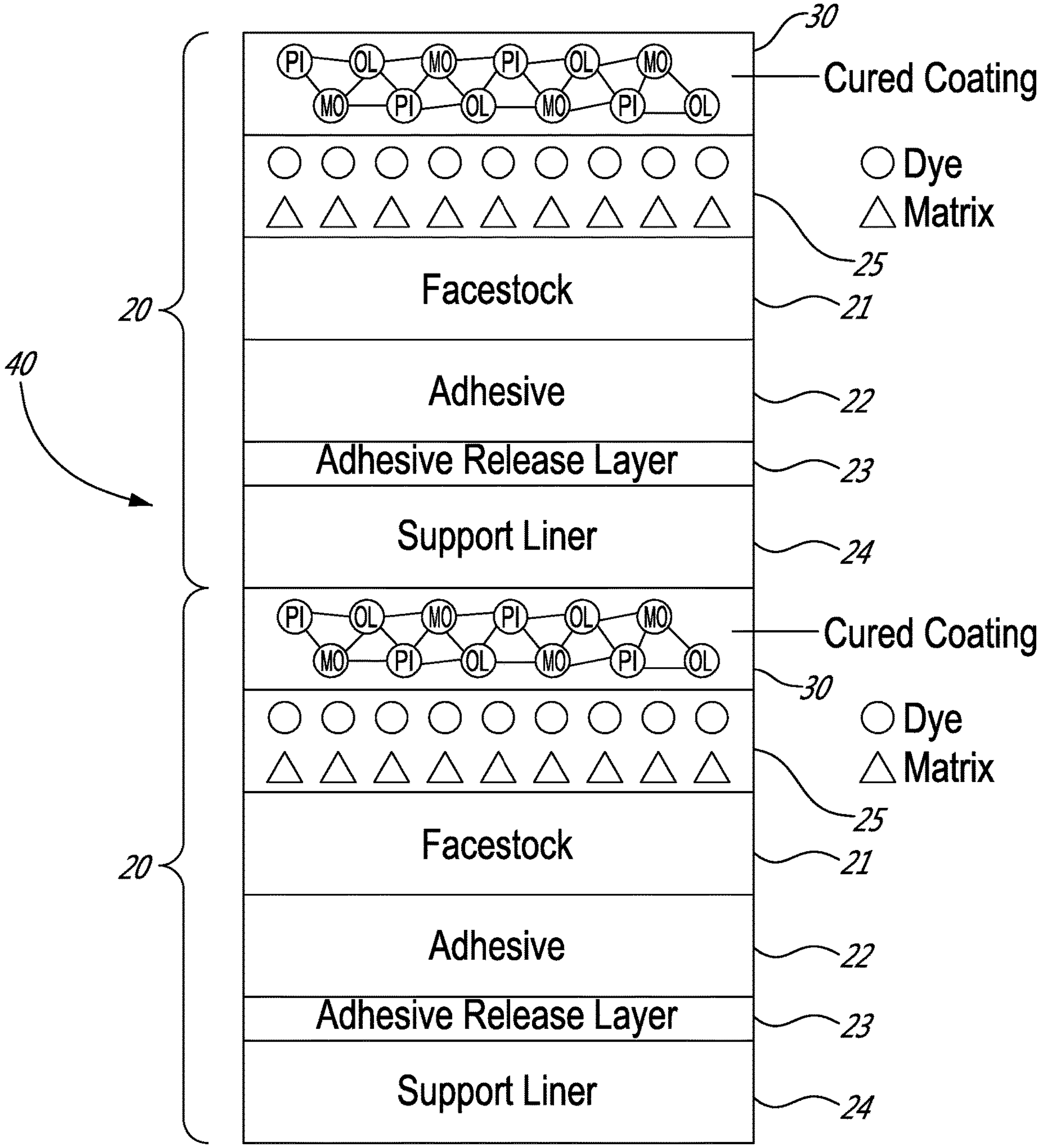
FIGS. 4A-4D are schematic views of various embodiments of the direct thermal label with LED UV coating, in a roll.
Figure 4B:
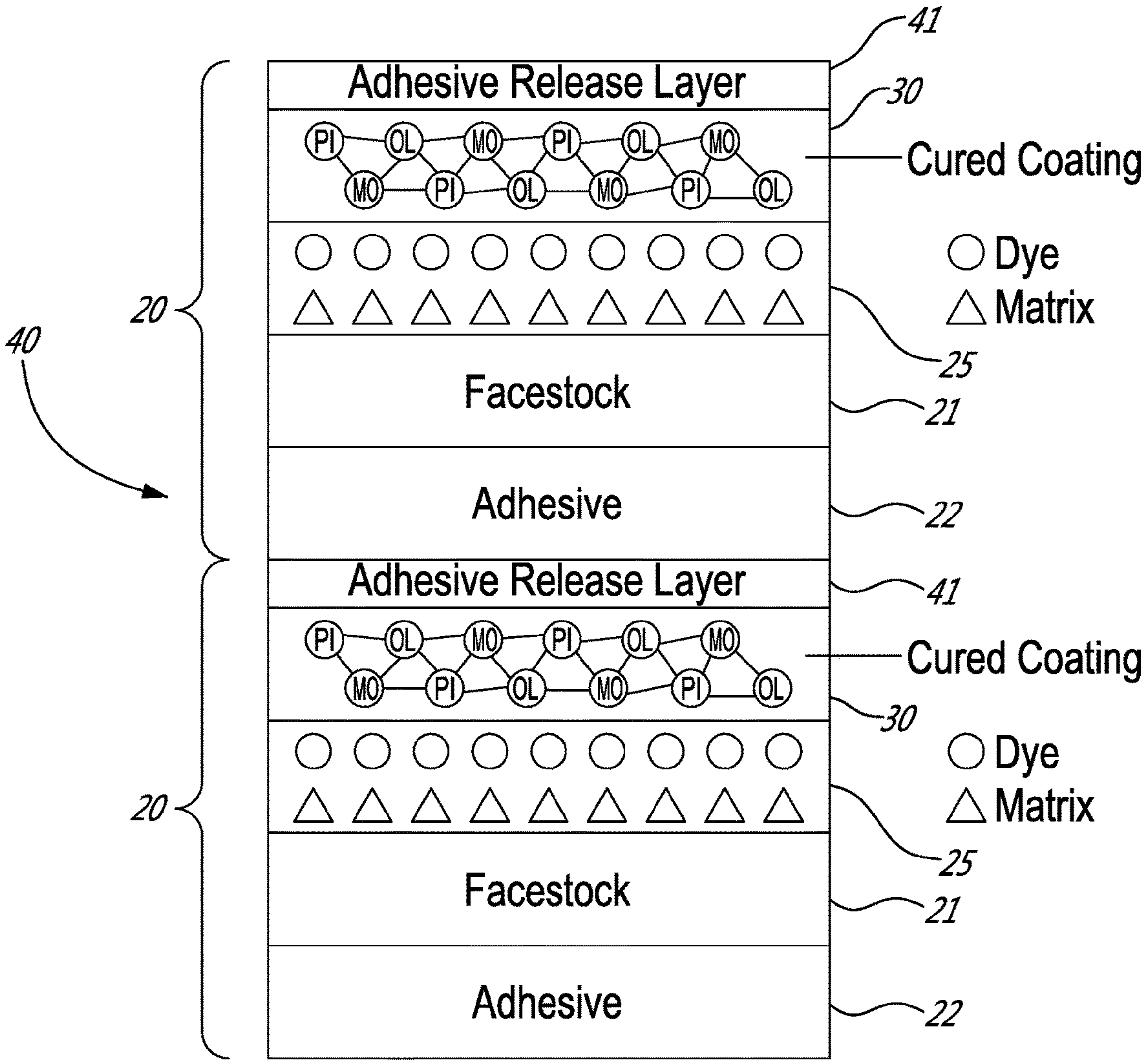
Figure 4C:
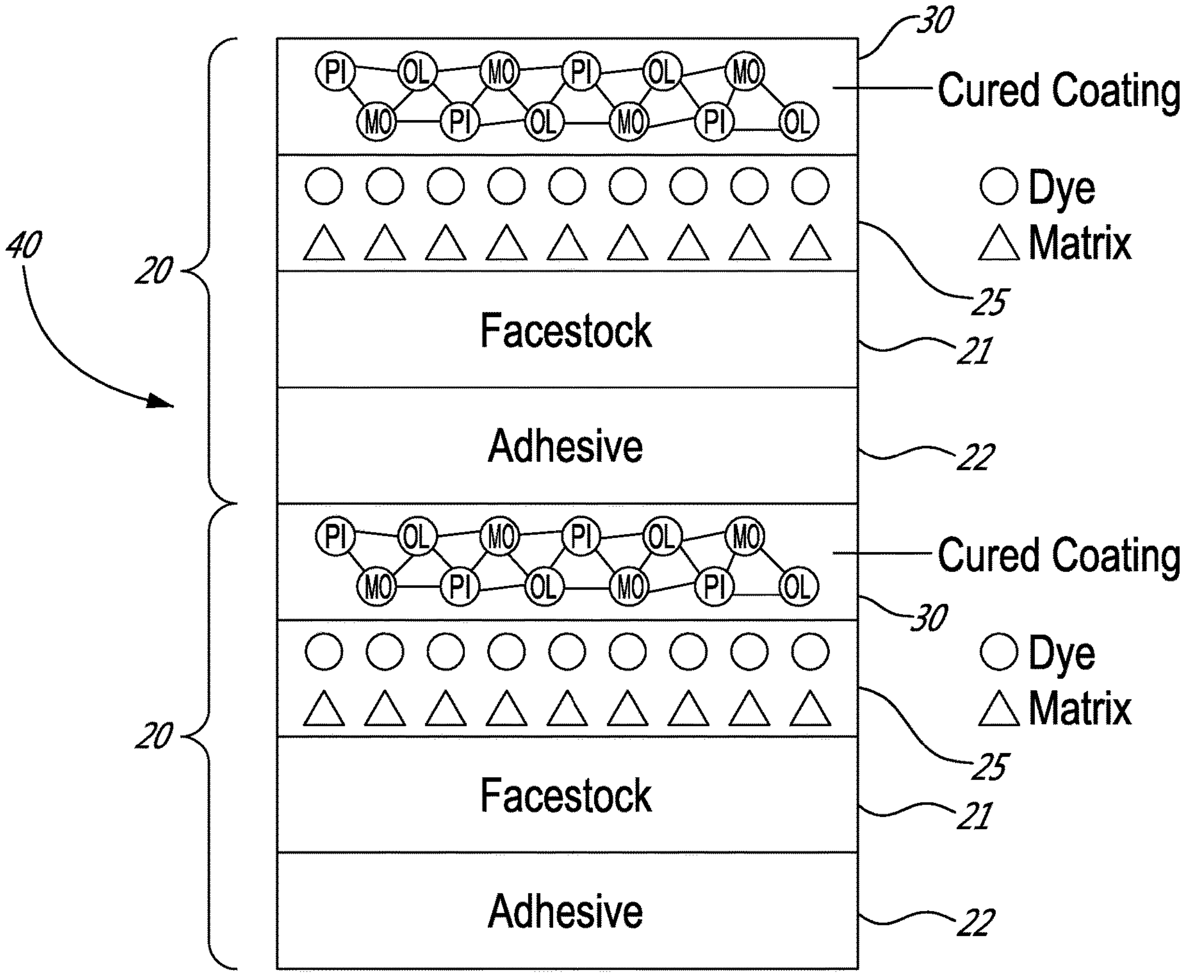

FIGS. 4A-4D shows different embodiments of the direct thermal label 20, for example when in a roll 40. When in a roll 40, the direct thermal label 20 is in an elongated strip that is wound on itself. Accordingly, in FIG. 4A there are shown two passes of the direct thermal label 20 on itself, but it is understood that there may be numerous other passes of the direct thermal label 20 on itself, the passes harboured one on top of the other. In FIG. 4A, the direct thermal label 20 is as in FIG. 3A, with adhesive release layer 23 and support liner 24. In FIG. 4B, the adhesive release layer 23 and support liner 24 on the bottom of the adhesive layer 22 are absent. In such an embodiment, as the label 20 with direct thermal coating 25 is without a support liner 24, an adhesive release layer 41 may be laid on top of the LED UV coating 30. The adhesive release layer 41 is present to facilitate the release of the label 20 from itself, with the adhesive 22 from a top pass detaching from the adhesive release layer 41 from an under pass. The adhesive release layer 41 is selected so as not to interfere with the direct thermal printing. The adhesive release layer 41 may be a transparent coating comprising silicone including silicone, solvent-free silicone, fluorosilicone, UV-curable silicone or wax or may be devoid of silicone including fluorosilicone, UV-curable silicone, solvent-free silicone or wax such as non-silicone based or non-solvent based release coatings or it may comprise water-based coatings or 100% solids coatings that can facilitate the release of the adhesive 22 while not interfering with the LED UV coating functions. The adhesive release layer 41 may be added after the LED UV layer is applied and cured. In FIG. 4C, the adhesive release layer 23 and support liner 24 on the bottom of the adhesive layer 22 are also absent, as the LED UV coating 30 described hereinafter serves as an adhesive release layer. In such an embodiment, the LED UV coating 30 may incorporate silicone or other compounds and additives facilitating a release of the adhesive 22 from the LED UV coating. In another configuration, shown in FIG. 4D, the adhesive layer 22, the adhesive release layer 23 and support liner 24 are absent. The facestock 21 of a top pass lays on the LED UV coating 30 of a lower pass, without adhesion therebetween.

The adhesive release layer 41 may be any release coating permitting the release of the adhesive 22 from the LED UV coating shown as 30. For example, the adhesive release layer 41 may include but is not limited to release coatings which are solvent-based, solventless, water-based, acrylic based, emulsion based, heat curable, radiation curable, (e.g. UV-curable, LED-curable, LED-UV curable, etc.). The solid contents of such coatings may be within the range of 5%-100% inclusively. Some release coatings that may constitute the adhesive release layer 41 may include silicone coatings, solvent-free silicone, fluorosilicone, UV-curable silicone coatings or non-silicone coatings which can be writable or printable after curing. The writable or printable characteristic may include the capacity of accepting non-limitatively ink from a ball-point pen, gel-ink, marking pen (e.g. Sharpie permanent marker), permanent marker, dry-erase marker, felt-tip pen, felt-tip marker, solid marker, pencil, stamping, marking from any other type of writable instrument or technique, including any type of digital printing, flexographic printing, gravure printing, lithographic printing, liquid electrophotography printing, inkjet printing, water-based UV printing, UV-inkjet printing, LED-printing, laser printing, radiation-curable printing, LED-curable printing, UV-curable printing, thermal-transfer printing, direct thermal printing, electron beam printing, laser-etch, screen printing, sublimation printing, etc. In an embodiment, the adhesive release layer 41 is selected to have a surface energy within a given range for selected inks to be retained therein, while preserving the adhesive release capability for the release of a tape pass adhered to the adhesive release layer 41. The substance or coating used for the adhesive release layer 41 may be selected as a function of its surface energy, to enable the layer 41 to retain ink, and limit smudging, etc. In a variant, the adhesive release layer 41 is specified to have a surface energy that is greater than that of the surface tension of the ink it may receive. For example, the surface energy of the adhesive release layer 41 is at least 2 dynes/cm greater than the surface tension of the ink. In another variant, the surface energy of the adhesive release layer 41 is at least 10 dynes/cm greater than the surface tension of the ink that may be paired with the label 20. In yet another variant, the surface energy of the adhesive release layer 41 is equal to or greater than 40 dynes/cm. As a consequence, in some variants, the adhesive release layer 41 is said to be writable or printable, due to its capacity of retaining ink, while also preserving its adhesive release capability, for example when the tape 20 is in the roll 40. As another variant the surface energy of the adhesive release layer 41 is between 10-15 dynes/cm. As another variant the surface energy of the adhesive release layer 41 is between 15-20 dynes/cm. As another variant the surface energy of the adhesive release layer 41 is between 20-23 dynes/cm, As another variant the surface energy of the adhesive release layer 41 is between 23-25 dynes/cm. As another variant the surface energy of the adhesive release layer 41 is between 25-28 dynes/cm. As another variant the surface energy of the adhesive release layer 41 is between 28-32 dynes/cm. As another variant the surface energy of the adhesive release layer 41 is between 33-36 dynes/cm. As another variant the surface energy of the adhesive release layer 41 is between 37-40 dynes/cm. As another variant the surface energy of the adhesive release layer 41 is equal or above 41 dynes/cm.

The adhesive release layer 41 may be a solid layer on the LED UV coating 30, the solid layer being silicone based or non-silicone based.

Figure 4D:
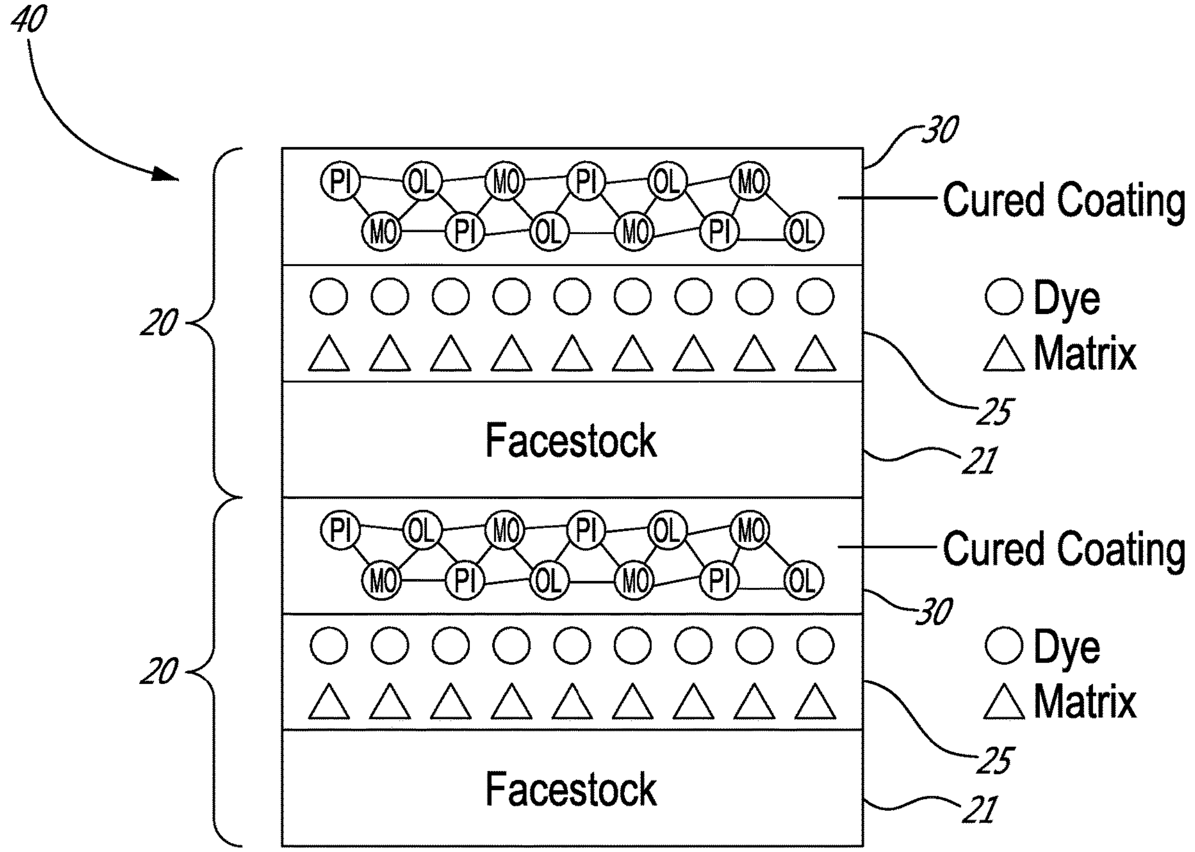

The embodiments of FIGS. 4B, 4C and 4D may be used as part of linerless label configurations for the labels 20 of the present disclosure, in a continuous roll of tape. The continuous roll of tape is shown at 40 in FIG. 5 as well. The use of linerless labels has a significant environmental advantage helping to eliminate the use of the release liners 24, also eliminating the adhesive release layer 23 in some embodiments. The release liner 24 may represent a non-negligible use of paper resources, as well as in some cases a solvent such as silicone that may not be environmentally friendly, considering that the release liners 24 with or without the adhesive release layer 23 are wasted once the label 20 is separated therefrom.

Stated differently, other embodiments for the label 20 include a label and/or uncut label material without the adhesive release layer 23, a support liner 24 shared by singular or numerous facestocks 21 and adhesive 22, or the label 20 without the support liner 24. The label 20 may have any appropriate shape, including round, square, rectangular, to name but a few of the possibilities. Moreover, a plurality of the labels 20 may be interconnected in a sheet, roll, etc, for example with tear-off perforations or cuts. For example, when the label 20 is in a roll or strips, as shown and described below with reference to FIGS. 4A to 4D, some tear cuts may be present, such as described in U.S. Pat. No. 11,319,464, the contents of which are incorporated herein by reference.

The label 20 has a direct thermal coating 25, with dye and matrix. For example, the direct thermal coating 25 includes a thermochromic ink and/or a thermochromic ink activation substance. The direct thermal coating 25 is heat sensitive as it reacts to heat to darken. Zones or surfaces are selectively heated to darken, these zones contrasting with the color of the facestock 21 and constituting the printing on the label 20. According to an embodiment, a thermochromic ink of the coating 25 is a leuco dye. These dyes have a colorless leuco form when crystalline in a pH neutral environment, and become colored when exposed to an acid. Examples of acids suitable for thermochromic materials are phenols, e.g., Bisphenol A (BPA) and Bisphenol S (BPS). Other suitable acidic substances can be used as developers for leuco dyes (sulfonyl ureas, zinc salts of substituted salicylic acids, etc.). To optimize the colorization temperature and to facilitate mixing, sensitizers can optionally be added to the direct thermal coating 25, such as 1,2-bis-(3-methylphenoxy)ethane or 2-benzyloxynapthalene. These ethers are solvents for leuco dyes and developers, and facilitate color formation at a specific temperature. To stabilize the color formed by the leuco dye, developer and sensitizer, a stabilizer might be added to the direct thermal coating 25 prior to application on the label 20. As a non-limitative example, stabilizers may be phenols that inhibit recrystallization of the dye and developer, thereby stabilizing the printed image. The above described technology is presented as an example, and not all constituents thereof are required to be present in the direct thermal coating 25 in order to achieve a thermal printing. For example, the direct thermal coating 25 might be activated without a sensitizer or stabilizer or both. Different types of thermochromic inks and developers can be used.

A LED UV coating 30 covers the direct thermal coating 25. As an example, the LED UV coating 30 may be a benzophenone-free transparent coating that forms a protective shield to protect the printing on the label 20 from solvents and chemicals. In a variant, the LED UV coating 30 may in addition protect the printing on the label 20 from environmental conditions such as sunlight, water, rain, humidity. The level of activation may depend on the intensity and/or power of the LED-UV lamp, speed of the material moving under the lamp, the distance of the lamp from the material, etc. In some circumstances a lower percentage of activation of photoinitiators may take place which may be sufficient to cure the coating to a degree to make it usable for certain applications. Therefore, the curing is done without heat activating the direct thermal coating 25. As shown in FIG. 2C, the label 20 therefore has a LED UV coating 30 prior to being thermally printed. Basic constituents of a LED UV coating 30 are monomers, oligomers, prepolymers, polymers, photoinitiators for curing or any combination thereof. In addition, some additives such as acrylates, metacrylates, UV absorbers, vinyls, optical brighteners, surfactants and/or other compounds may be present as an example. A more efficient cure is possible with a formulation designed specifically for LED curing using a photoinitiator with more concentrated absorption in the UV-A range.

As a non-limitative example, the UV LED coating 30 described above was tested and its curing was attempted with ordinary mercury based UV curing system, in comparison to LED curing. In particular testing conditions, the mercury based curing showed a lower level of resistance to alcohol, around 1-2 minutes, compared to 60 minutes of resistance when a similar coating 30 was cured with a LED UV diode source. The mercury based UV light source creates a wider range of UV light and the specific wavelength necessary for activating the photoinitiators within the spectrum can only partially cure the LED UV coating 30. As a result, a significant portion of the LED UV coating 30 may not be properly cured with a mercury based UV curing system, resulting in less resistance to chemicals. Therefore, tests may indicate that the chemical resistance of the LED UV coating 30 may be dependent on the percentage of photoinitiator (PI) activations and as a result to the percentage of curing taking place during the UV radiation of the LED UV coating 30. The activation of the photoinitiators depends on a few factors, such as the moving speed of the label 20 or the material of the label 20 prior to die-cutting through the press, the distance of the light from the label 20, and how much exposure the UV LED coating 30 gets during the curing process. Under optimal conditions approximately 75-95% of the photoinitiators get activated in LED diode generated radiation resulting a strong protection of the ink underneath the UV LED coating 30—again as an option.

Referring to FIG. 3A, the label 20 is shown in its ready-for-printing condition, i.e., with the cured LED UV coating 30 thereon. In FIG. 3A, the label 20 is blank meaning there has been no heat activation of the direct thermal coating 25. The facestock 21 and the direct thermal coating 25 are thus shielded by the LED UV coating 30. When print head A is applied to the label 20, it may heat the selected zones of the direct thermal coating 25 through the LED UV coating 30. The heat may be for example conducted through the LED UV coating 30 to the selected zones of the direct thermal coating 25. The LED UV coating 30 does not lose its shielding properties in spite of the heating with the direct thermal printer A.

Figure 5:
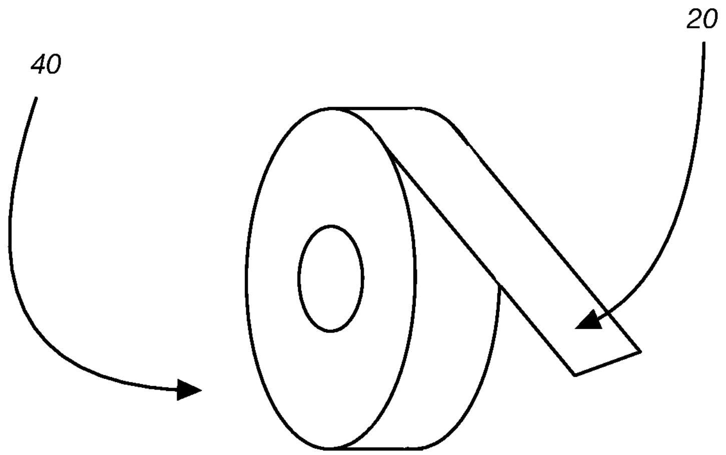
FIG. 5 is a schematic view of a roll or tape of direct-thermal material with LED UV coating in accordance with the present disclosure.

Therefore, in accordance with an embodiment, the label 20 has a facestock 21 adapted to be adhered to an object. The object may be any type of object, such as objects used in laboratories, including vials, tubes, blood collection tubes such as Vacutainers, sample collection tubes, microscope slides, tissue processing cassettes, plates, cell culture plates, microtiter plates, microarray plates, other types of plates, petri dishes, bottles, flasks, freezer boxes, cryogenic boxes, cryogenic straws, goblets other type of laboratory plastic containers, laboratory glassware and metal objects such as freezer racks, liquid nitrogen racks, canisters, etc. Furthermore, other objects, containers and surfaces in other industries such as automotive, construction, transportation, healthcare, packaging, shipping, food, meat-packing, seafood, shelf-marking, inventory management, retail, merchandising, etc. are covered by the present disclosure. A direct thermal coating 25 is on the facestock 21. The direct thermal coating 25 is configured to locally darken by heat activation when direct thermal printed. A cured ultraviolet LED coating 30 is on the direct thermal coating 25. The cured ultraviolet LED coating 30 has photoinitiators activated to at least 30% with exposure to a 365 nm-450 nm wavelength range, such as light produced by UV LEDs. The cured ultraviolet LED coating is configured to allow direct thermal printing of the direct thermal coating therethrough. The ultraviolet LED coating 30 is cured without creating heat sufficient to heat activating the direct thermal coating 25. In a variant, the label 20 in its various forms, including in a roll 40 (as shown in FIG. 5), may include any active or passive RFID tags of any frequency, NFC tags of any frequency, wireless communication tags of any wavelength, or like electronic and/or electrical components.

In accordance with another embodiment, a method is defined for fabricating a direct thermal label 20. The ultraviolet LED coating 30 is applied on the direct thermal coating 25 on the facestock 21. The ultraviolet LED coating 30 is substantially cured by exposure to ultraviolet light-emitting diodes producing light in a wavelength range of 365 nm-450 nm. While substantially curing the ultraviolet LED coating, the direct thermal coating 25 is maintained below a threshold temperature above which the direct thermal coating 25 is activated. The direct thermal coating 25 may be selected to have activation temperatures that may be more than the 55° C. discussed above, as the activation temperatures may be 55-60° C., 60-65° C., 65-70° C., 70-75° C., 75-80° C., 80-85° C., 85-90° C., 90-95° C., 95-100° C., 100-105° C., 105-110° C., 110-115° C., 115-120° C., 120-125° C., 125-130° C., 130-135° C., 135-140° C., 140-145° C., 145-150° C., 150-155° C., 155-160° C., 160-165° C., 165-170° C., 170-175° C., 175-180° C., 180-185° C., 185-190° C., 190-195° C., 195-200° C., 200-205° C., 205-210° C., 210-215° C., 215-220° C., 220-225° C., 225-230° C. or above. The direct thermal coating 25 may be selected as a function of its activation temperature, depending on the contemplated use. For example, the label 20 may be selected as a function of the equipment that is equipped with printheads having given activation temperatures, as an example among others.

In the various embodiments in which support liner 24 is present, it is considered to have various discrete labels 20 on a common support liner 24, for instance in a roll configuration, fanfold configuration, sheet configuration or in a strip. For example, the labels 20 may be on a support liner 24 in accordance with the teachings of U.S. patent application Ser. No. 17/092,719 (published as United States Patent Application Publication No. 20220058984), the contents of which are incorporated herein by reference.

In accordance with another embodiment, a method for using a direct thermal label or tag is provided. The label 20 is obtained with the direct thermal coating 25 shielded by the cured ultraviolet LED coating 30. Selected zones of the direct thermal coating 25 are heat activated through the ultraviolet LED coating 30 to darken the selected zones. The label 20 is adhered with the selected zones darkened to an object.

The combination of the high temperature resistant direct thermal coating 25 with the UV LED coating 30 may result in a significantly wider use of such labels in industries where a regular direct thermal label or tags cannot be used such as in medical laboratories, automotive, food packaging e.g. in sea-food industries, etc, to name a few of the possibilities.

The invention claimed is:

1. A roll of direct-thermal material comprising:

a length of direct-thermal material, the direct-thermal material including a facestock, an adhesive layer on a first side of the facestock, a direct thermal coating on a second side of the facestock, the direct thermal coating configured to selectively darken by heat activation when direct thermal printed, and a cured ultraviolet LED coating on the direct thermal coating, the cured ultraviolet LED coating having photoinitiators with substantial activation at an exposure limited to LED radiation at a 365 nm-450 nm wavelength range, and configured to allow direct thermal printing of the direct thermal coating therethrough, the cured ultraviolet LED coating curable without heat activating the direct thermal coating;

wherein the length of direct-thermal material being rolled on itself.

2. The roll of direct-thermal material according to claim 1, wherein the cured ultraviolet LED coating is a benzophenone-free transparent coating.

3. The roll of direct-thermal material according to claim 1, wherein the direct thermal coating includes a thermochromic ink and/or a thermochromic ink activation substance.

4. The roll of direct-thermal material according to claim 3, wherein the thermochromic ink is a leuco dye.

5. The roll of direct-thermal material according to claim 4, further including a stabilizer in the direct thermal coating to inhibit recrystallization of the leuco dye.

6. The roll of direct-thermal material according to claim 5, wherein the stabilizer is a phenol.

7. The roll of direct-thermal material according to claim 4, further including a sensitizer in the direct thermal coating to optimize the colorization temperature and to facilitate mixing.

8. The roll of direct-thermal material according to claim 7, wherein the sensitizer is 1,2-bis-(3-methylphenoxy)ethane or 2-benzyloxynapthalene.

9. The roll of direct-thermal material according to claim 4, wherein the direct thermal coating includes Bisphenol A (BPA), Bisphenol S (BPS), sulfonyl ureas, and/or zinc salts of substituted salicylic acids.

10. The roll of direct-thermal material according to claim 1, wherein the facestock has a thickness between 0.2 mil-20.0 mil, inclusively.

11. The roll of direct-thermal material according to claim 1, wherein the facestock is made of a fiber-based material, a polymer, a synthetic film, a synthetic paper, a thermoplastic film, polyolefin, polypropylene, biaxially oriented polypropylene (BOPP), polyimide, polyamide, polyester, polyvinyl, polyethylene, cloth, fabric, paper, impregnated paper, metallized film or foil, or polystyrene.

12. The roll of direct-thermal material according to claim 1, wherein the cured ultraviolet LED coating includes a compound facilitating a release of an adhesive on the cured ultraviolet LED coating.

13. The roll of direct-thermal material according to claim 1, further comprising a support liner upon which the adhesive layer is releasably adhered.

14. The roll of direct-thermal material according to claim 13, further comprising an adhesive release layer between the adhesive layer and the support liner.

15. The roll of direct-thermal material according to claim 1, wherein the adhesive layer of a first roll pass is harbored adhered to the cured ultraviolet LED coating of a second roll pass.

16. The roll of direct-thermal material according to claim 1, further including an adhesive release layer on the cured ultraviolet LED coating.

17. The roll of direct-thermal material according to claim 16, wherein the adhesive release layer is silicone based.

18. The roll of direct-thermal material according to claim 16, wherein the adhesive release layer is non-silicone based.

19. The roll of direct-thermal material according to claim 1, wherein the cured ultraviolet LED coating is a solvent-resistant coating.

20. The roll of direct-thermal material according to claim 1, wherein the cured ultraviolet LED coating has the substantial activation of at least 30%, at least 40% or at least 50% of the photoinitiators.

21. The roll of direct-thermal material according to claim 16, wherein the adhesive release layer has a surface energy within a given range for the adhesive release layer to retain ink.

22. The roll of direct-thermal material according to claim 1, wherein the direct thermal coating has a direct thermal coating activation temperature equal or above 130° C.

23. The roll of direct-thermal material according to claim 1 wherein a layer of ink is between the direct thermal coating and the cured ultraviolet LED coating.

24. The roll of direct-thermal material according to claim 1 wherein a layer of ink is between the facestock and the direct thermal coating.

* * * * *